United States Patent
Qiu et al.

(10) Patent No.: US 10,256,712 B2
(45) Date of Patent: Apr. 9, 2019

(54) CURRENT RIPPLE SENSING CONTROLLER FOR A SINGLE-STAGE LED DRIVER

(71) Applicant: Queen's University at Kingston, Kingston (CA)

(72) Inventors: Yajie Qiu, Kingston (CA); Yan-Fei Liu, Kingston (CA)

(73) Assignee: Queen's University at Kingston, Kingston (CA)

( * ) Notice: Subject to any disclaimer, the term of this patent is extended or adjusted under 35 U.S.C. 154(b) by 0 days.

(21) Appl. No.: 15/758,942

(22) PCT Filed: Sep. 15, 2016

(86) PCT No.: PCT/CA2016/051085
§ 371 (c)(1),
(2) Date: Mar. 9, 2018

(87) PCT Pub. No.: WO2017/045075
PCT Pub. Date: Mar. 23, 2017

(65) Prior Publication Data
US 2018/0248472 A1    Aug. 30, 2018

Related U.S. Application Data

(60) Provisional application No. 62/220,436, filed on Sep. 18, 2015.

(51) Int. Cl.
*H02M 1/14* (2006.01)
*H05B 33/08* (2006.01)
*H02M 1/42* (2007.01)
*H02M 1/00* (2006.01)

(52) U.S. Cl.
CPC ......... *H02M 1/143* (2013.01); *H02M 1/4258* (2013.01); *H05B 33/0815* (2013.01); *H02M 2001/0009* (2013.01); *Y02B 70/126* (2013.01)

(58) Field of Classification Search
CPC .......... H02M 1/14; H02M 1/143; H02M 1/42; H02M 1/4208; H02M 1/4258;
(Continued)

(56) References Cited

U.S. PATENT DOCUMENTS 6,650,554 B2 * 11/2003 Darshan ................. H02H 9/001
  323/207
2014/0252973 A1 * 9/2014 Liu ........................... H02J 1/02
  315/200 R (Continued)

OTHER PUBLICATIONS

Fang, P. et al., "A Flicker-Free Single-Stage Offline LED Driver With High Power Factor", IEEE, pp. 654-665, (2015).
(Continued)

*Primary Examiner* — Thai Pham
(74) *Attorney, Agent, or Firm* — Stephen J. Scribner

(57) ABSTRACT

A current-ripple-based control strategy for an AC-DC converter with a series ripple cancellation converter (RCC). Embodiments provide series ripple cancellation by sensing the load current information, and significantly simplify the control circuitry. In addition, the embodiments allow input voltage of the series RCC to tightly track its output voltage peak value with no extra control circuit, thus minimizing the RCC component voltage stress as well as the RCC loss. Embodiments are suitable for driving an LED load, where they eliminate LED light flicker caused by the power factor correction (PFC) stage, and significantly reduce its output capacitance.

15 Claims, 20 Drawing Sheets

(58) Field of Classification Search
CPC .. H02M 2001/0003; H02M 2001/0009; H05B 33/08; H05B 33/0815; H05B 37/02
See application file for complete search history.

(56) References Cited

U.S. PATENT DOCUMENTS

2017/0250620 A1* 8/2017 White ............... H02M 1/4258
2018/0069424 A1* 3/2018 Yang ................ H02J 7/0052

OTHER PUBLICATIONS

International Search Report and Written Opinion dated Dec. 20, 2016 for corresponding International Application No. PCT/CA2016/051085 filed on Sep. 15, 2016.
Lee, K-W., et al., "A Current Ripple Cancellation Circuit for Electrolytic Capacitor-less AC-DC LED Driver", IEEE, pp. 1058-1061, (2013).
Qiu, Y., et al., "A Novel Bipolar Series Ripple Compensation Method for Single-Stage High-Power LED Driver", IEEE pp. 861-868, (2015).
Fang, P. et al., "Zero Ripple Single Stage AC-DC LED Driver with Unity Power Factor", IEEE, pp, 3452-3458, (2013).
Qiu, Y. et al., "Electrolytic-Capacitor-Less High-Power LED Driver", IEEE, pp. 3612-3619, (2014).
Qiu, Y., et al., "Current-Ripple Based Control Strategy to Achieve Low-Frequency Ripple Cancellation in Single-Stage High-Power LED Driver", IEEE, 5316-6322 (2015). Date of Conference Sep. 20-24, 2015.

* cited by examiner ($V_{LED}$=150V $I_{LED}$=0.67A; $P_o$=100W, 27 LED chips) ($V_{LED}$=90V $I_{LED}$=0.67A; $P_o$=60W, 15 LED chips)

CH1: AC coupled PFC stage output voltage ($v_{main\_ac}$)

CH2: DC coupled FB RCC output voltage ($v_{FB}$)

CH3: DC coupled FB RCC input voltage ($V_{Caux}$)

CH4: DC coupled LED string current ($I_{LED}$)

($V_{LED}$ =150V $I_{LED}$ =0.4A; $P_o$ =60W, 27 LED chips)  ($V_{LED}$ =150V $I_{LED}$ =0.2A; $P_o$ =30W, 27 LED chips)

CH1: AC coupled PFC stage output voltage ($v_{main\_ac}$)

CH2: DC coupled FB RCC output voltage ($v_{FB}$)

CH3: DC coupled FB RCC input voltage ($V_{Caux}$)

CH4: DC coupled LED string current ($i_{LED}$)

CURRENT RIPPLE SENSING CONTROLLER FOR A SINGLE-STAGE LED DRIVER

RELATED APPLICATION

This application claims the benefit of the filing date of Application No. 62/220,436, filed 18 Sep. 2015, the contents of which are incorporated herein by reference in their entirety.

FIELD

The invention relates to AC-DC converters for driving loads such as LEDs. In particular, the invention relates to a current-ripple-based control strategy for an AC-DC converter with a series ripple cancellation converter.

BACKGROUND

For a conventional single-stage AC-DC converter with high power factor, the output voltage usually contains a low frequency (double line frequency, or second harmonic) ripple component, due to imbalance of input and output power. This second harmonic (e.g., 120 Hz in North America or 100 Hz in China, Europe) is of particular concern for DC lighting applications, such as LED lighting, as it results in visible flickering wherein the human eye can see fluctuation of the light emitting from the LED. The fluctuating light output may be undesirable in certain lighting applications, as well as harmful to human eyes.

In order to solve this problem, a series ripple cancellation converter (RCC) may be used to cancel the double line frequency voltage ripple from the single-stage LED driver. The RCC may be an additional small power converter that is connected in series with the main power factor correction (PFC) output. As a result, a pure DC voltage is obtained and is applied to the LED lamps to produce DC LED current.

Series ripple cancellation converters typically employ a voltage-ripple-based feedback control strategy, as shown in the block diagram of FIG. 1A. According to this approach, the two series-connected output voltages (the main PFC stage output voltage, $v_{main}$, and the RCC stage output voltage, $v_{FB}$) are sensed simultaneously to achieve ripple cancellation. The sensing circuit for the RCC is shown in FIG. 1B where two differential to single-ended voltage conversion circuits are required. Thus, series ripple cancellation converters that employ a voltage sensing feedback control strategy suffer from the drawback of relatively complex and uneconomical signal-sensing circuits. Moreover, the voltage sensing feedback control strategy has a potential mismatch problem due to parameter tolerance of the sensing circuits, resulting in inferior ripple cancellation performance.

SUMMARY

Described herein is a controller for a power converter comprising a main PFC stage and a ripple cancellation converter, the controller comprising: a circuit that senses the power converter load current; a main PFC stage control loop that regulates an average load current; and a current ripple control loop that regulates the ripple cancellation converter, such that a double line frequency load current ripple is substantially cancelled.

In one embodiment, the current ripple control loop includes an AC current ripple sensing block and a compensation network.

In one embodiment, the main PFC stage control loop and the current ripple control loop share the same load current sensing circuit.

In one embodiment, the current ripple control loop comprises a double loop; including:
a slow voltage control loop that regulates the ripple cancellation converter output voltage average value; and a fast current ripple cancellation loop; wherein the output voltage is always lower than an input voltage of the ripple cancellation converter.

Also described herein is a method for controlling a power converter comprising a main PFC stage and a ripple cancellation converter, comprising: sensing the power converter load current; using a main PFC stage control loop to regulate an average load current; and using a current ripple control loop to regulate the ripple cancellation converter, such that a double line frequency load current ripple is substantially cancelled.

In one embodiment, the method comprises using one load current sensing circuit for the main PFC stage control loop and the current ripple control loop.

In one embodiment, the method comprises sensing the double-line-frequency current ripple ($i_{rip}$) by blocking the DC component of the LED current.

In one embodiment, the method comprises controlling the double-line-frequency current ripple to approach a non-ripple reference; generating an error signal; using the error signal and a compensation network to regulate a control signal for the RCC; wherein the RCC generates an out of phase double-line-frequency voltage ripple; wherein a resulting load current is substantially ripple-free.

In one embodiment, using a current ripple control loop comprises: using a slow voltage control loop that regulates the ripple cancellation converter output voltage average value; and using a fast current ripple cancellation loop; wherein the output voltage is always lower than an input voltage of the ripple cancellation converter.

Also described herein is a controller for an AC-DC power converter comprising a main PFC stage, the controller comprising: a circuit that senses the power converter load current; a main PFC stage control loop that regulates an average load current; and a current ripple control loop that uses the sensed power converter load current to generate a signal corresponding to a double-line-frequency ripple of the load current, and uses the signal to regulate a series ripple cancellation converter output; wherein the series ripple cancellation converter output substantially cancels the double-line-frequency ripple in the load current.

The current ripple control loop may include an AC current ripple sensing block and a compensation network. The main PFC stage control loop and the current ripple control loop may share the same load current sensing circuit. The series ripple cancellation converter may comprise a converter topology selected from full-bridge, buck, flyback, boost, buck-boost, and full-bridge floating capacitor. The series ripple cancellation converter may comprise a floating capacitor full-bridge converter.

In one embodiment, the current ripple control loop comprises a double loop; including: a slow voltage control loop that regulates the ripple cancellation converter output voltage average value; and a fast current ripple cancellation loop that uses the double-line-frequency load current ripple to regulate the series ripple cancellation converter output; wherein the double-line-frequency load current ripple is substantially cancelled.

Also described herein is a method for controlling an AC-DC power converter comprising a main PFC stage, comprising: sensing the power converter load current; using a main PFC stage control loop to regulate an average load current; and using a current ripple control loop to generate a signal corresponding to a double-line-frequency ripple of the load current, and using the signal to regulate a series ripple cancellation converter output; wherein the series ripple cancellation converter output substantially cancels the double-line-frequency load current ripple.

The method may comprise using one load current sensing circuit for the main PFC stage control loop and the current ripple control loop. Sensing the double-line-frequency current ripple may comprise blocking a DC component of the LED current.

In one embodiment, the signal corresponding to the double-line-frequency ripple of the load current may be an error signal generated by subtracting the double-line-frequency current ripple and a non-ripple reference; the method comprising using the error signal to regulate the series ripple cancellation converter to generate an out of phase double-line-frequency voltage ripple; wherein the out of phase double-line-frequency voltage ripple cancels the double-line-frequency ripple in the PFC output voltage, resulting in cancellation of the double-line-frequency ripple in the load current.

In one embodiment, using a current ripple control loop may comprise: using a slow voltage control loop that regulates the ripple cancellation converter output voltage average value; and using a fast current ripple cancellation loop that uses the double-line-frequency load current ripple to regulate the series ripple cancellation converter output; wherein the double-line-frequency load current ripple is substantially cancelled.

In the embodiments, the load may comprise one or more LED.

Also described herein is an AC-DC power converter comprising a controller as described herein, including a main PFC stage. The AC-DC power converter may be an LED driver.

BRIEF DESCRIPTION OF THE DRAWINGS

For a better understanding of the invention, and to show more clearly how it may be carried into effect, embodiments will be described, by way of example, with reference to the accompanying drawings, wherein:

FIGS. 15A and 15B show simulation results of a double-loop current ripple sensing embodiment, with $V_{in}$=85 Vac, $V_{LED}$≈60 V, $I_{LED}$=4 A, $P_O$=240 W, wherein FIG. 15B is a zoomed-in view of $V_{LED\_ripple}$

DETAILED DESCRIPTION OF EMBODIMENTS

Described herein is a current-ripple-based feedback strategy for use with a main stage PFC converter and a ripple cancellation converter stage that facilitates series ripple cancellation based on sensing load (e.g., LED) current only. As the LED current is also a basic controlled item for the main stage PFC controller, the sensing circuit to achieve power factor correction in the main stage can be also used to achieve series ripple cancellation, which significantly simplifies the control circuit.

Ripple cancellation as provided by embodiments described herein refers to cancellation, elimination, or significant reduction of the double-line-frequency component in the LED current, defined herein as $i_{rip}$, such that the LED current is substantially ripple-free ($i_{rip}$=0). For practical purposes, the LED current may be considered to be ripple-free ($i_{rip}$=0), insofar as any remaining ripple is small enough to avoid visible flickering. For example, ripple cancellation means that the LED current meets or exceeds the standards set forth in IEEE 1789-2015 (*IEEE Recommended Practices for Modulating Current in High-Brightness LEDs for Mitigating Health Risks to Viewers*, 26 Mar. 2015), which specifies that at 120 Hz, 10% maximum flicker is allowable. Considering a linear relationship between output lumens and LED driving current, a maximum of 10% double-line-frequency current ripple is allowable. Embodiments described herein typically achieve values of 2% or less.

The term "substantially" as used herein with respect to a value or level is intended to mean a value or level that is close to a desired or theoretical value or level, and that allows an embodiment to operate as described. Such a value or level may be that which is achieved in an implementation where performance may be affected by tolerances of components, ranges of signals, operating conditions, and/or other practical limitations.

Existing series RCC approaches may include a winding-connected RCC or a floating capacitor RCC. The winding-connected series RCC method has an additional winding from the main transformer to provide an auxiliary voltage as the input of the ripple cancellation converter. The floating capacitor approach avoids the need for an auxiliary transformer winding and diode, making the input side capacitor of the auxiliary circuit floating and rendering a more flexible solution for both isolated and non-isolated LED driver applications. The current-ripple-based feedback strategy described herein will work with either of these approaches.

Figure 2A:
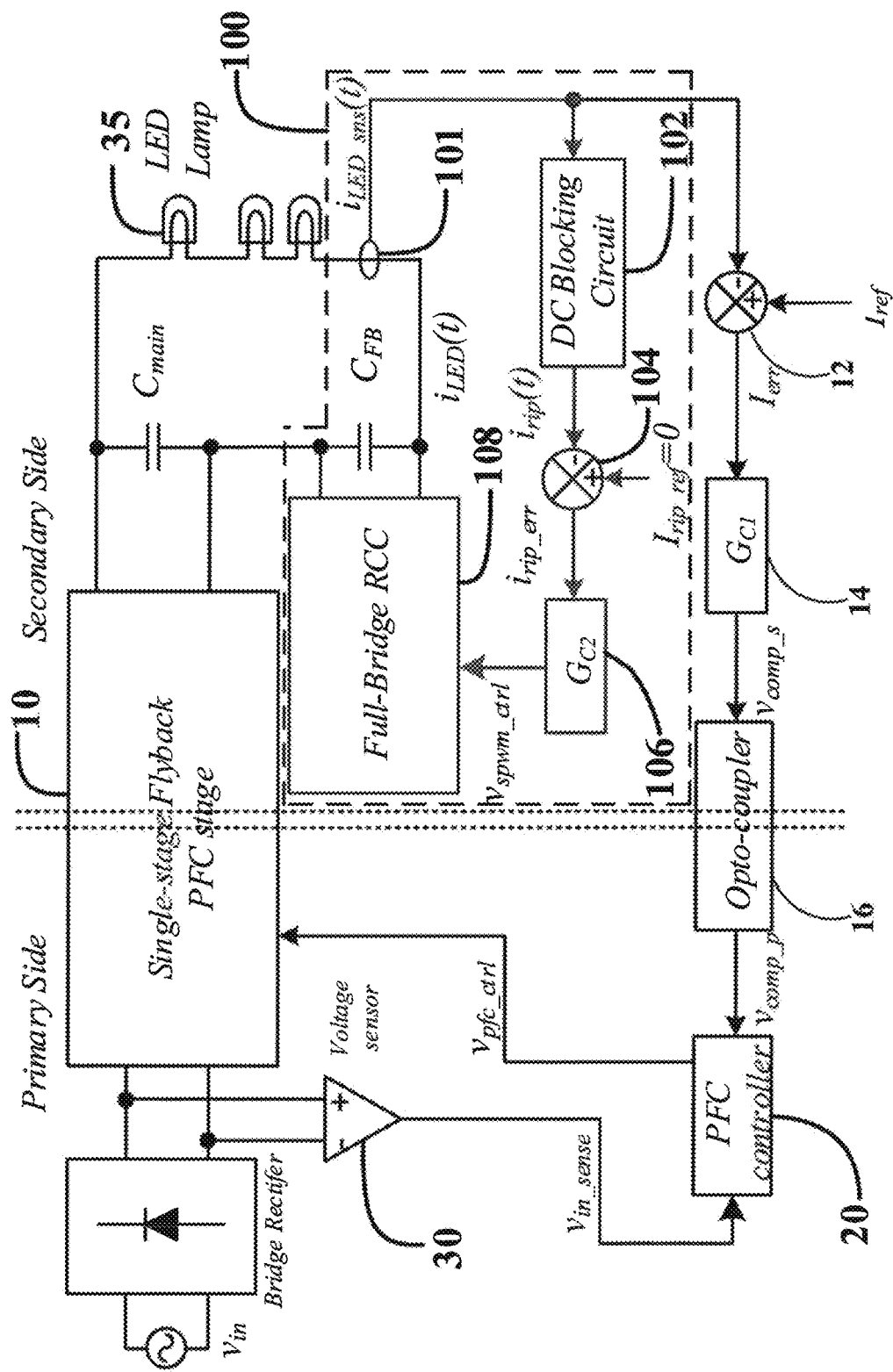
FIG. 2A is a diagram showing a current ripple sensing control strategy for series ripple cancellation, according to one embodiment.

In general, current-ripple-based control strategy embodiments comprise two current control loops: (i) a main PFC stage control loop regulating the average LED current, and (ii) a current ripple control loop that cancels the double-line-frequency LED current ripple. One embodiment is shown in FIG. 2A. The main PFC stage control loop includes a single-stage flyback PFC stage 10 with output capacitor $C_{main}$ as the main output stage, current sensor 101, subtractor 12, compensation network ($G_{C1}$) 14, isolation device (opto-coupler) 16, PFC controller 20, and voltage sensor 30, where the input side and output side of the PFC stage are isolated (as shown by a double dotted line in the center of the figure). The load 35 may be a string of LEDs.

In the embodiment of FIG. 2A, the current ripple control loop 100, shown in the dashed box, includes a load current (AC and DC) sensing circuit 101, a DC blocking circuit 102, a subtractor 104, a compensation network ($G_{C2}$) 106, and a full-bridge RCC 108 with output capacitor $C_{FB}$. Operation of the current ripple control loop is as follows: the double-line-frequency current ripple ($i_{rip}$) is sensed by blocking the DC component of the LED current ($i_{LED}$) and is subtracted from a non-ripple reference ($I_{rip\_ref}$=0) at 104, generating an error signal ($i_{rip\_err}$). Based on this error signal, the compensation network 106 produces a sinusoidal pulse width modulation (SPWM) control signal ($v_{spwm\_ctrl}$) to force the full-bridge RCC 108 to generate an out of phase (i.e., inverted, 180° out of phase, or substantially 180° out of phase) double-line-frequency voltage ripple. Series connection of the full-bridge RCC output and the PFC output cancels the double-line-frequency voltage ripple in the PFC output, resulting in an LED current ($i_{LED(t)}$) that is ripple-free ($i_{rip}$=0) or substantially ripple-free ($i_{rip}$≈0). That is, the double-line-frequency component in the LED current is significantly reduced or eliminated.

Figure 2B:
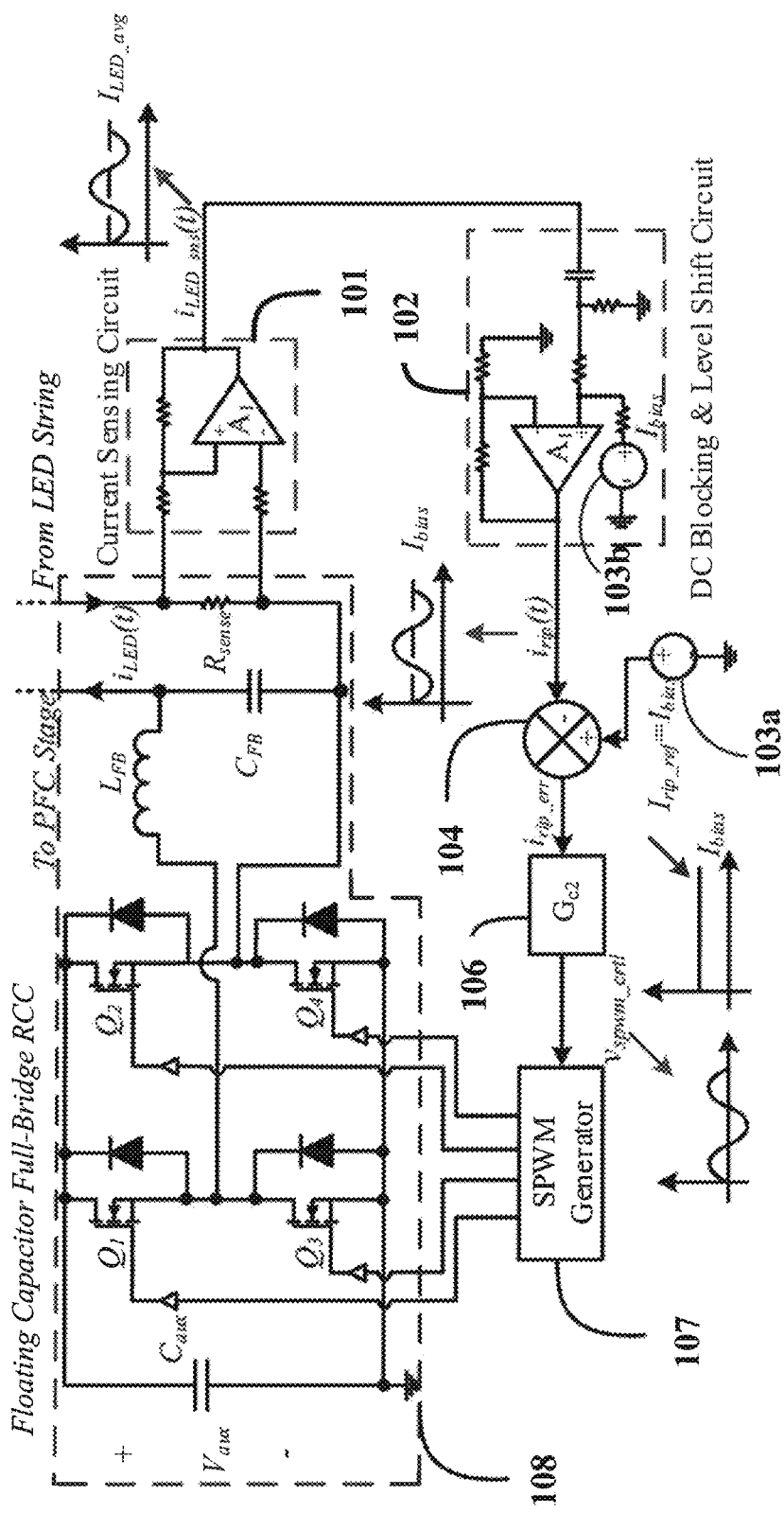
FIG. 2B is a diagram showing details of the control scheme embodiment of FIG. 2A.

It is noted from FIG. 2A that both the PFC controller 20 output ($v_{pfc\_ctrl}$) and the output from the compensation network 106 ($v_{spwm\_ctrl}$) are based on the LED current ($i_{LED}$), rather than the output voltage signals. Therefore, the PFC controller 20 and the full-bridge current ripple cancellation converter 108 may share the same LED current sensing circuit 101. In a practical implementation, to avoid the negative part of the sensed AC current ripple signal, a level shifter (e.g., a DC bias, $I_{bias}$) may be applied to both the sensed current ripple ($i_{rip}$) and its reference. An example of this is shown in the embodiment of FIG. 2B, which also shows further details of the control loop 100, wherein the series full-bridge RCC 108 is implemented with a floating capacitor RCC. In particular, a current sensing network is shown at 101 and a DC blocking and level shift circuit are shown at 102. The DC bias ($I_{bias}$) is shown at 103a and 103b. FIG. 2B also shows an SPWM generator 107 that receives the control signal ($v_{spwm\_ctrl}$) and generates the gating signals for the switches of the full-bridge RCC.

In various embodiments, the series RCC may be implemented with any DC-DC converter or DC-AC inverter, such as a full-bridge, buck, flyback, boost, buck-boost, etc. Where a full-bridge converter is used, it may be a floating capacitor implementation.

Figure 1A:
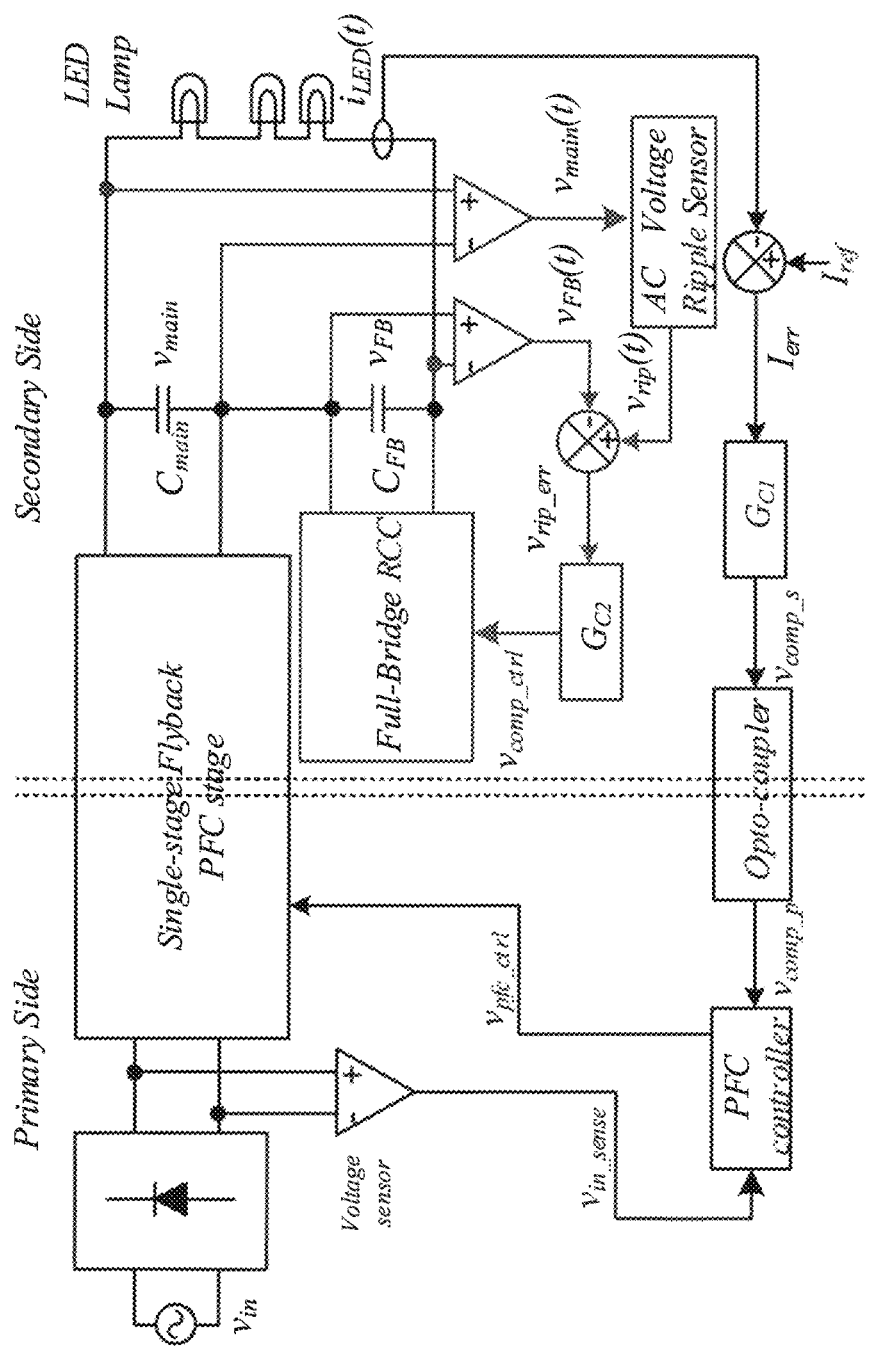
FIG. 1A is a diagram of a voltage-ripple-based control strategy for series ripple cancellation.
Figure 1B:
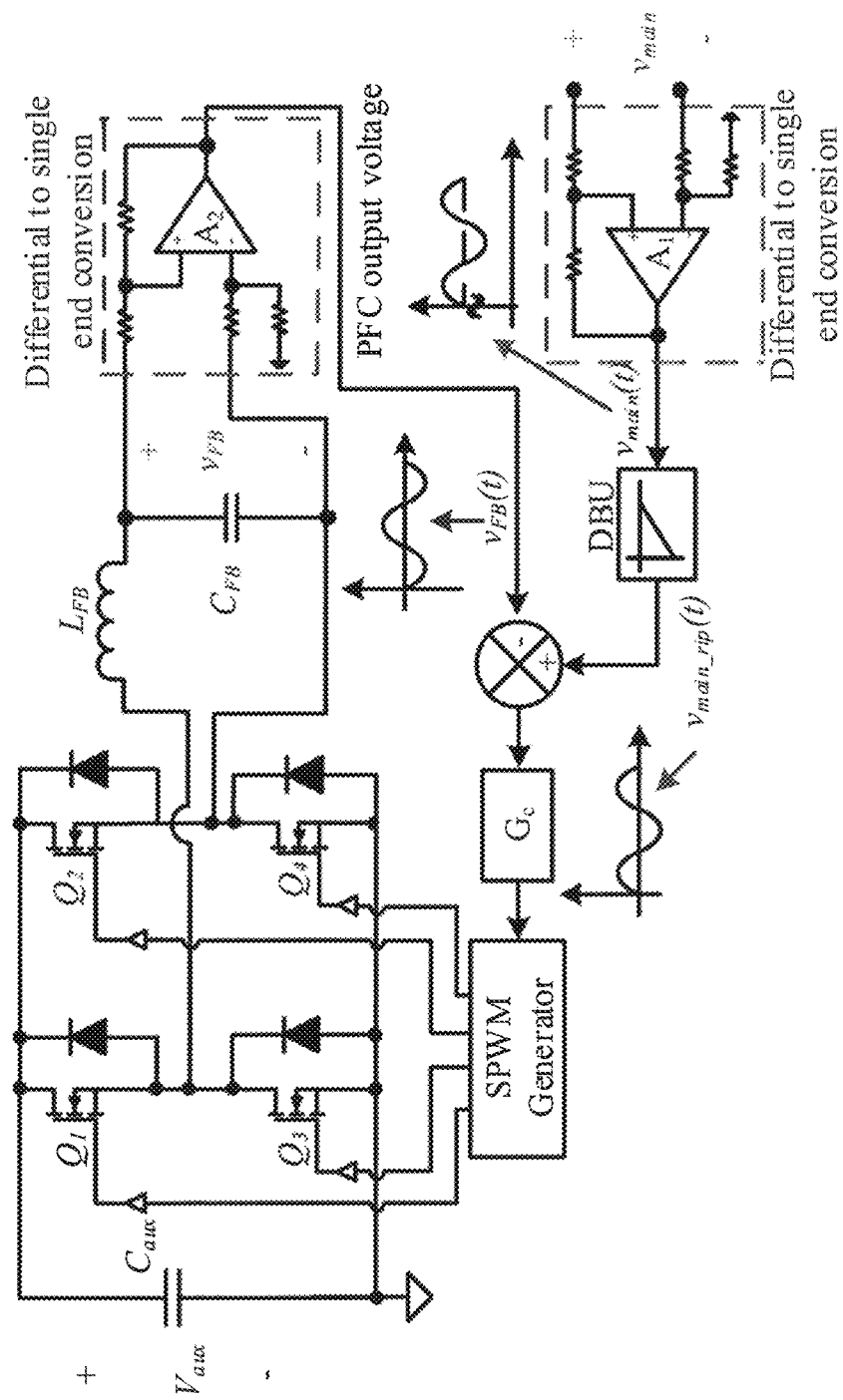
FIG. 1B is a diagram showing an implementation of a voltage sensing ripple cancellation converter and its control strategy, for the approach shown in FIG. 1A.
Figure 3:
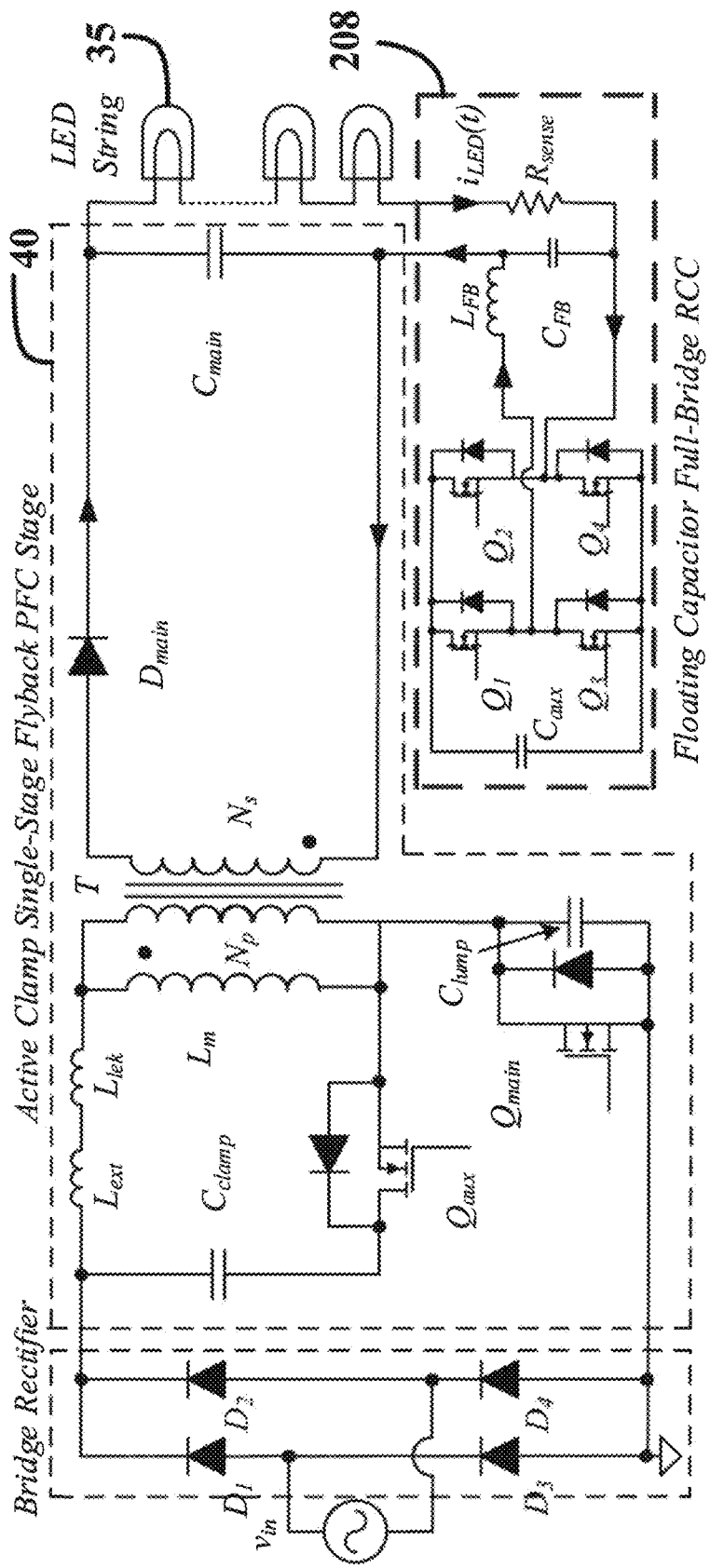
FIG. 3 is a diagram of a current ripple sensing embodiment with a full-bridge RCC.
Figure 4:
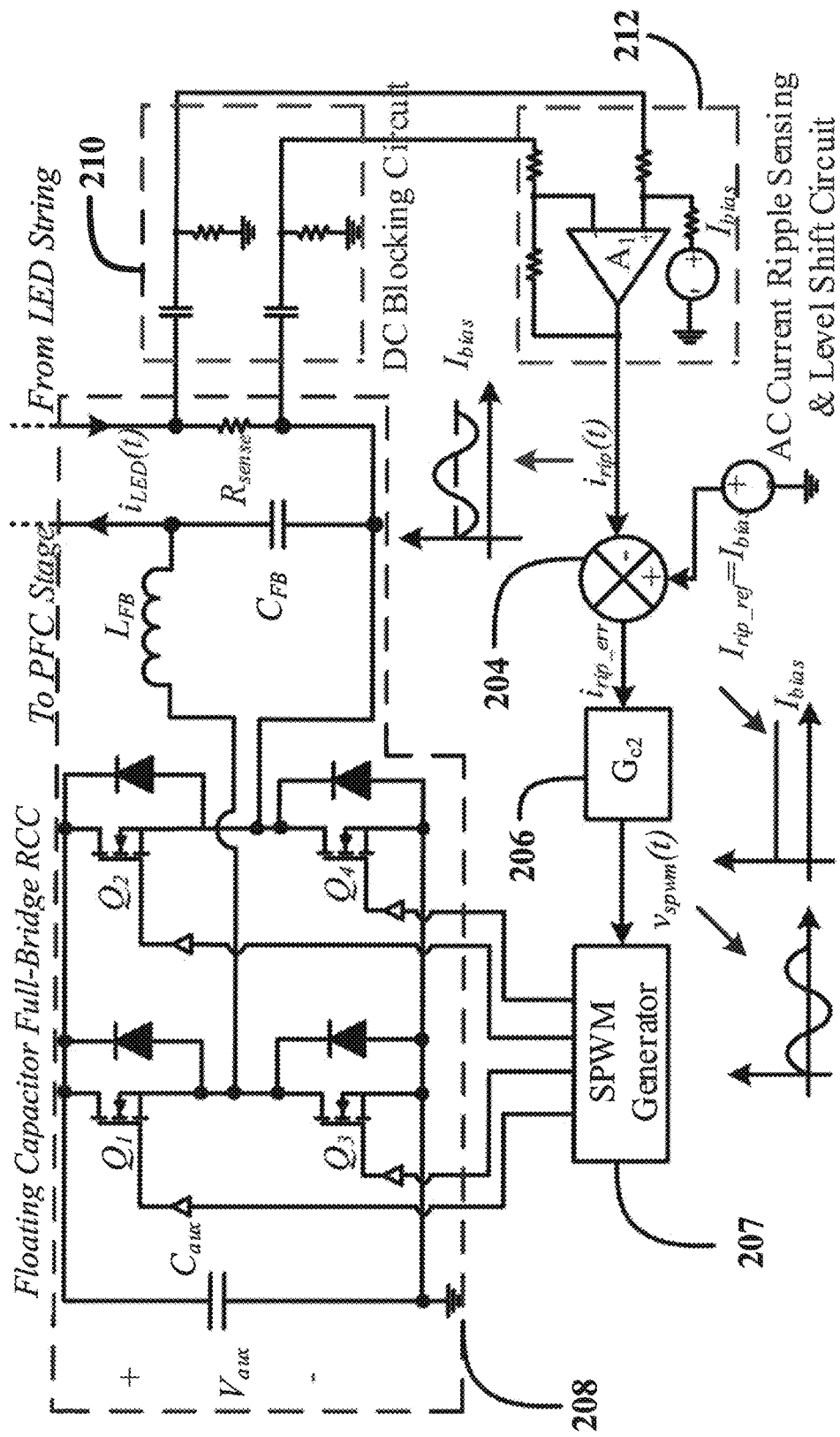
FIG. 4 is a diagram of a control scheme for the embodiment of FIG. 3.

FIG. 3 shows another embodiment of the current-ripple-based control strategy as applied to an LED driver, using an isolated single-stage flyback PFC stage 40, where a floating capacitor full-bridge inverter 208 is used as the series RCC (shown in the dashed box). FIG. 4 shows an embodiment of a current ripple control loop for the floating capacitor series RCC 208, including a subtractor 204, compensation network 206, and SPWM generator 207. Details of a DC blocking circuit 210 and an AC ripple sensing and level shift circuit 212 are also shown. Compared to the prior approach shown in FIG. 1B, the current-ripple-based control strategy simplifies the control circuit by removing two differential sensing single-ended voltage conversion circuits.

According to the control strategy, the full bridge RCC provides an inverted AC voltage ripple to cancel the double line frequency current ripple in the LED output current. The peak to peak value of the main stage's output ripple voltage $V_{ripple}$ may be evaluated via the LED current, $I_{LED}$, and the output capacitance, $C_{main}$, as shown in equation (1).

$$V_{ripple} = \frac{P_{in}}{\omega \times C_{main} \times V_{LED}} = \frac{I_{LED}}{2\pi \times f \times C_{main}} \quad (1)$$

Figures 5A, 5B:
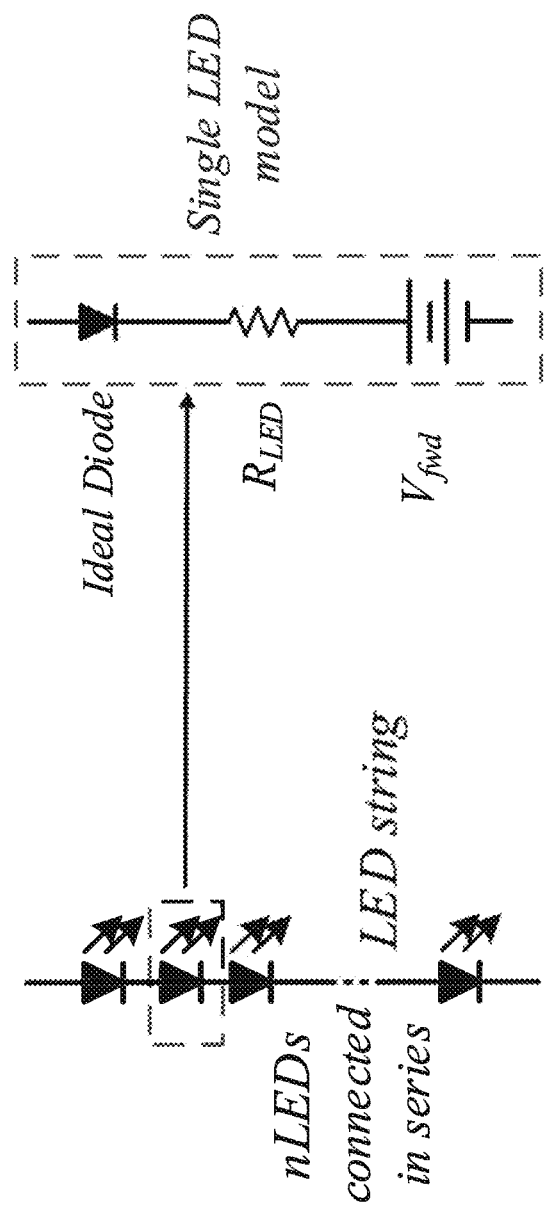
FIGS. 5A and 5B show an LED string load and an equivalent circuit of an LED.

An LED may be a single LED chip or lamp or may comprise two or more LED chips or lamps connected together (e.g., in series, parallel, or series-parallel). FIG. 5A shows a LED string as a load, and the linear model of each LED chip is shown in FIG. 5B. The model includes an equivalent voltage source ($V_{fwd}$) in series with an ideal diode and a small resister ($R_{LED}$). The relationship between the LED voltage and the current is dependent on the characteristics of the LED load, and is expressed in equation (2). The resistance and forward voltage of a LED load is dynamic with the forward current, but can be considered constant for a given average output current.

The relationship between the LED voltage and current ripple is expressed in equation (3).

$$I_{LED} = \frac{V_{LED\_string} - nV_{fwd}}{nR_{LED}} \quad (2)$$

$$\Delta I_{LED} = \frac{\Delta V_{LED\_string}}{nR_{LED}} \quad (3)$$

Given the low equivalent resister characteristic as well as the nonlinearity of the LED load, even a small LED voltage ripple ($\Delta V_{LED\_string}$) may result in a large LED current ripple ($\Delta I_{LED}$). This presents a challenge for the prior strategy shown in FIG. 1B, since it is difficult to cancel the current ripple by limiting the voltage ripple when the voltage ripple is too small to be detected.

In addition, compared to the prior voltage-ripple-based cancellation method requiring two differentially sensed voltage signals, current-ripple-based embodiments only sense the current ripple and compare it to a zero reference (a DC voltage), avoiding an error due to a mismatch between the two sensing circuits (as in FIG. 1B), and thus leading to a more effective solution to cancel the current ripple.

In order to accommodate different LED-load combinations, the driver must handle a wide output voltage range under the rated output current. The ratio of the highest output voltage over the lowest output voltage is usually higher than 1.5 times (e.g., $V_{LED}$=90~150 V). With prior ripple cancellation technologies, given the auxiliary winding turns ratio is fixed, the component voltage rating has to be overdesigned under the low output voltage operation (e.g., $V_{LED}$<150 V) to fit the voltage stress at the highest output voltage operation (e.g., $V_{LED}$=150 V), resulting a non-optimal solution in terms of the component voltage stress as well as the flyback RCC efficiency.

As to the ripple cancellation embodiment with a floating capacitor (FIGS. 3 and 4), the peak-to-peak value of the double line frequency voltage ripple in the PFC output, $V_{ripple}$, is only proportional to the LED output current $I_{LED}$ as well as the PFC output capacitance $C_{main}$, given the line frequency $f_{line}$ is fixed. Therefore, the voltage stress of the floating capacitor ($C_{aux}$) is designed based on the highest LED current $I_{LED}$ as the worst case and can be reduced close to but slightly higher than the peak voltage ripple at full load. However, since the floating capacitor voltage is regulated and fixed, the floating capacitor voltage may be much higher than the peak of the low frequency voltage ripple under a light LED current load, resulting in unnecessary loss in the flyback RCC.

The current-ripple-based control embodiments can achieve optimization of ripple cancellation with the minimum floating capacitor voltage regardless of the LED output voltage ($V_{LED}$) and loads ($I_{LED}$). The circuit operation is as follows, with reference to FIGS. 3 and 4. The flyback RCC (FBRCC) input voltage $V_{aux}$ is initially charged to exceed the peak value of $V_{ripple}$ by $I_{LED}$ due to its unidirectional flowing characteristic, and then the voltage starts decreasing due to the loss in the FBRCC. This results in V, being less than $V_{ripple}$ where the sinusoidal peaks are lost. The resulting LED current presents a small drop (less than its nominal value) at each valley of $v_{FB}$. The small distortion makes the RCC consume less energy during each positive half cycle than that it receives during each negative cycle, offsetting the RCC loss. The current bumps are fixed when the energy saved by the distortion equals to total RCC loss in each 120 Hz cycle. As a result, the RCC input voltage is auto-tuned and kept very close to but a bit less than the peak value of the output voltage without an extra input voltage regulation loop. Since the FBRCC loss is in proportion to its input voltage (given the fixed output AC voltage), with the current-ripple-based method the FBRCC component voltage stress and the loss are minimized.

In practical implementations, power loss of the RCC may result in instances where the RCC input voltage is lower than the 120 Hz voltage peak of the PFC output when the PFC output voltage reaches its peak value. When this happens the RCC cannot tightly follow the ripple peak, since the RCC's output voltage is higher than its input voltage. As a result, bumps may occur at 120 Hz in the output current, a phenomenon referred to herein as "under-cancellation", shown in FIG. 8B The under-cancellation phenomenon may be overcome by using a double-loop control method, wherein a slow voltage control loop is provided to regulate the ripple cancellation converter output voltage (average value), in addition to the fast current ripple cancellation loop. With the slow voltage loop regulating the average output voltage, the output voltage is always lower than the input voltage of the RCC. Therefore, the RCC is able to generate a DC voltage with an out-of-phase voltage ripple that substantially or completely cancels the 120 Hz ripple component in the PFC output voltage.

Figure 6:
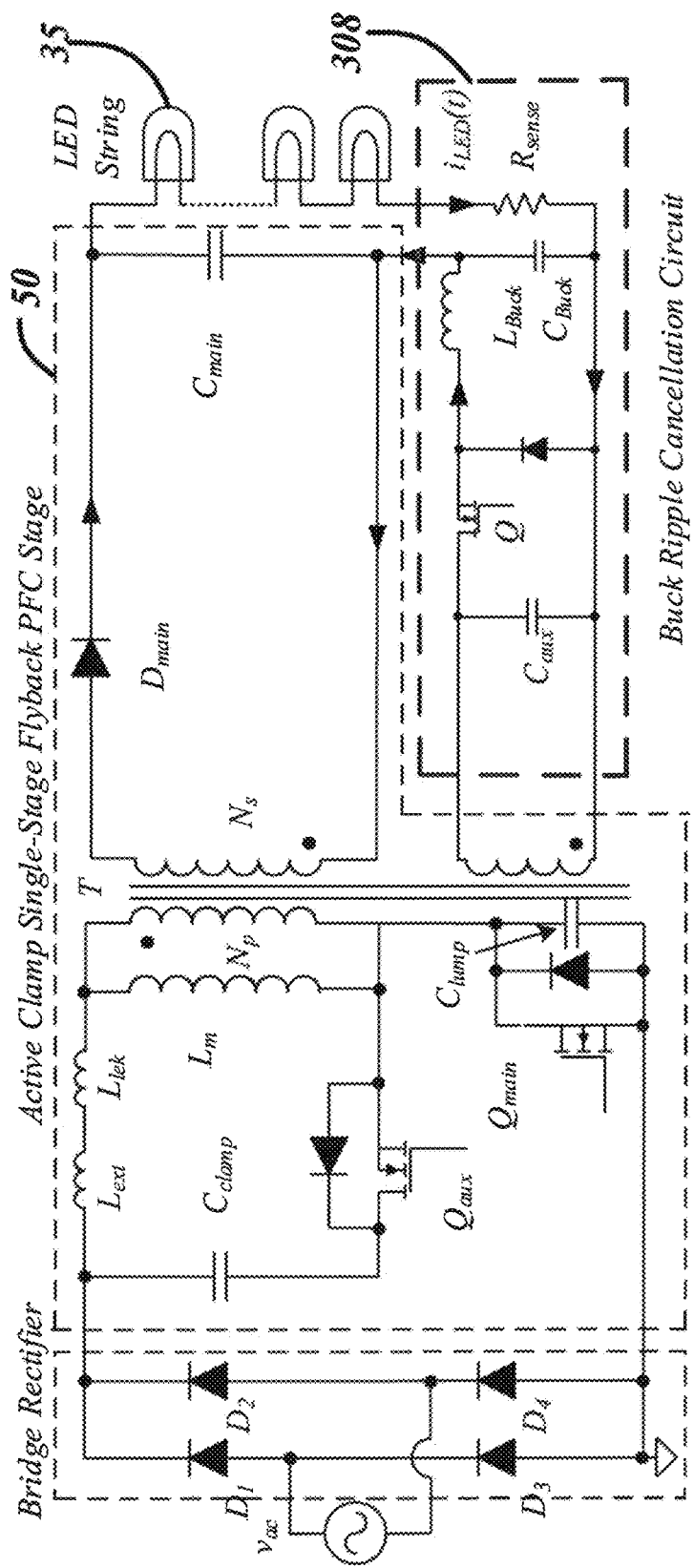
FIG. 6 is a diagram of a current ripple sensing embodiment with a buck RCC.
Figure 7:
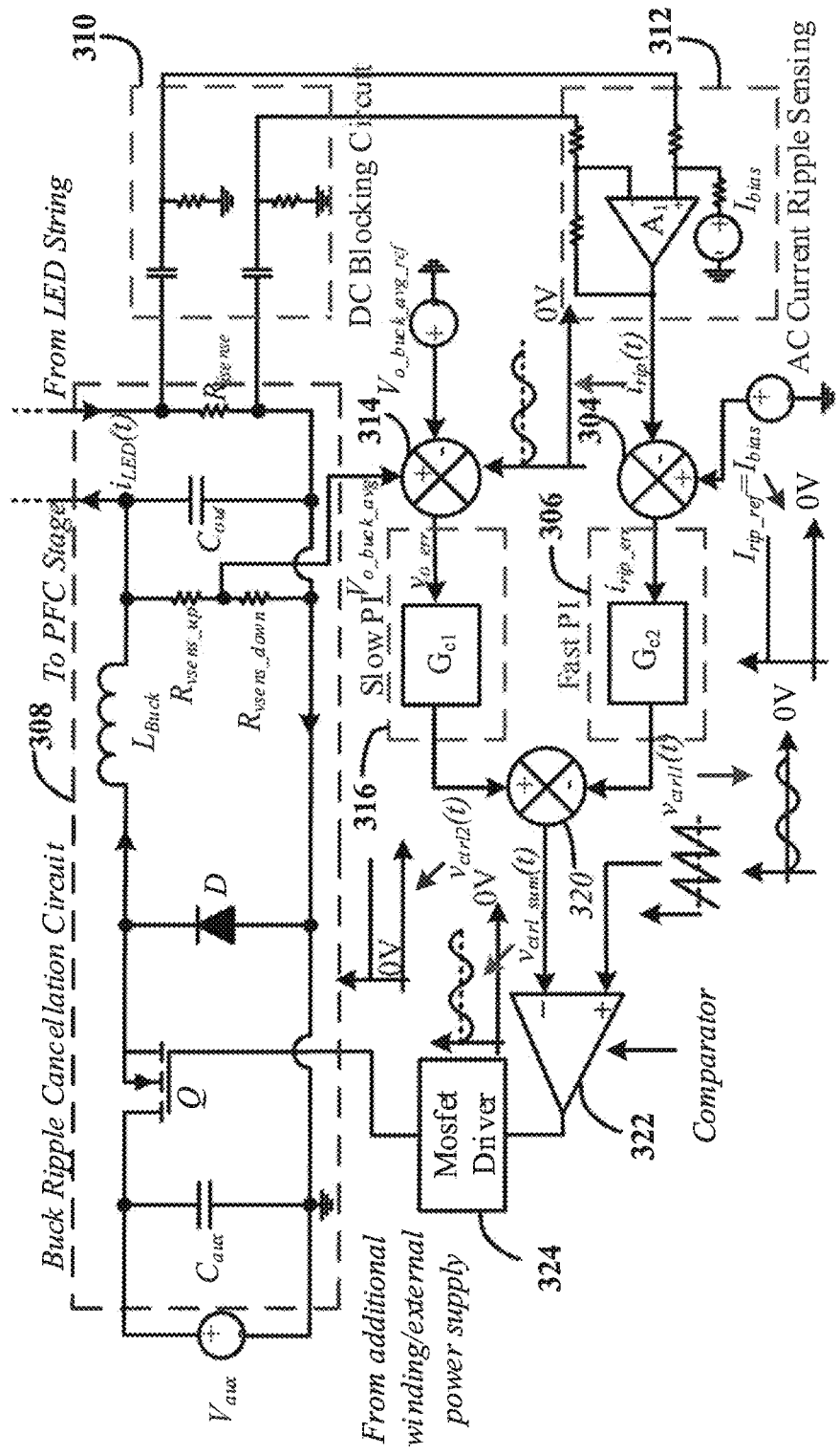
FIG. 7 is a diagram of a control scheme for the embodiment of FIG. 6.
Figure 8A:
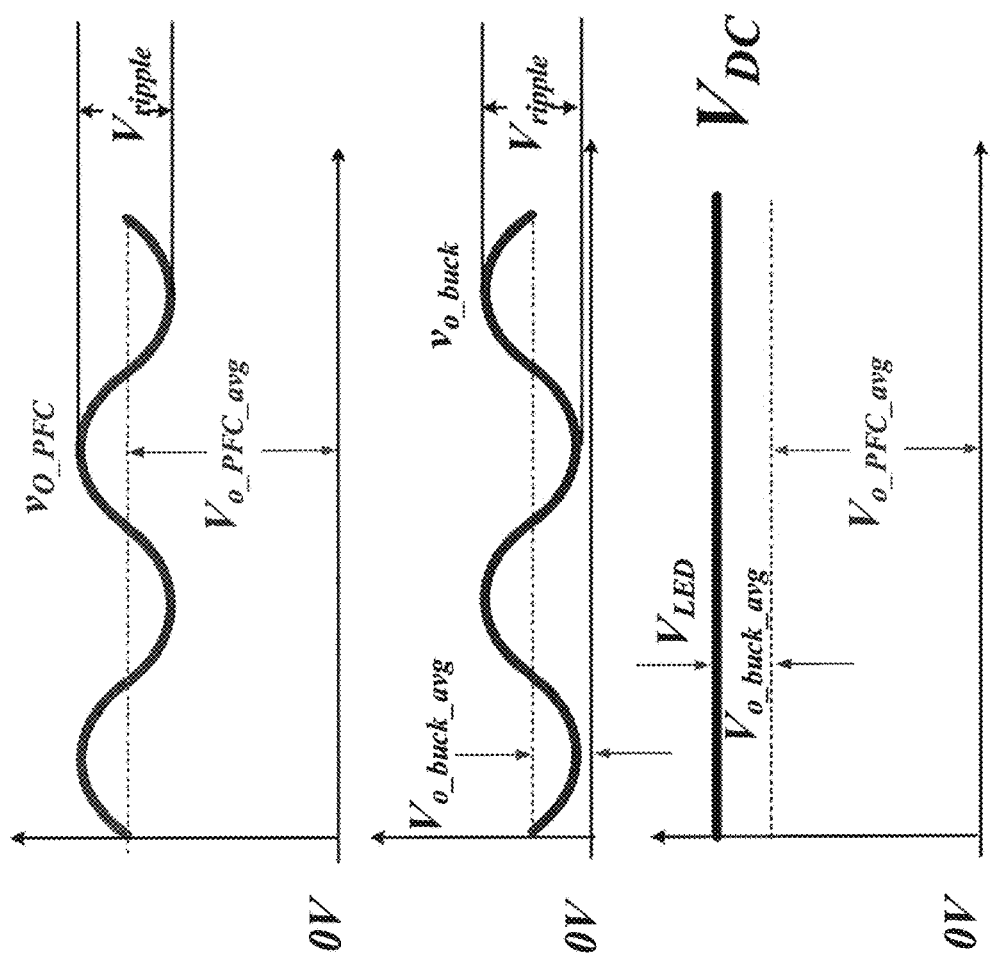
FIG. 8A shows typical waveforms of the embodiment of FIG. 6.

FIG. 6 shows an embodiment including a flyback PFC stage 50 that uses a buck converter as the RCC 308, as an example of an implementation of the double loop current ripple sensing method, and FIG. 7 is an embodiment of a control scheme with slow and fast control loops. FIG. 8A shows typical waveforms. As can be seen in the embodiment of FIG. 7, the slow PI loop is used to regulate the average value of the ripple cancellation circuit output voltage. At 314 the sensed output voltage ($V_{o\_buck\_avg}$) is compared to the reference ($V_{o\_buck\_avg\_ref}$) to produce an error signal that is fed to the slow PI 316 and a DC control voltage ($v_{ctrl2}(t)$) is generated. The fast PI loop is used to cancel the 120 Hz current ripple in the LED current. The double line frequency current ripple ($i_{rip}(t)$) is obtained by blocking the DC component of the LED current ($i_{LED}$) at 310 and sensing at 312, optionally with a DC offset ($I_{bias}$). The current ripple $i_{rip}(t)$ is compared to a non-ripple reference ($I_{rip\_ref}=I_{bias}$) at 304, which generates an error signal ($i_{rip\_err}(t)$). Based on this error signal, the fast PI 306 produces control output $v_{ctrl1}(t)$. The two control outputs are subtracted at 320 to produce $v_{ctrl\_sum}$ which is compared to a saw-tooth wave at 322 to generate the driving signal at 324 for the ripple cancellation circuit 308. Thus, the driving signal is regulated to force the ripple cancellation circuit 308 to generate an inverse double-line-frequency voltage ripple on the regulated average voltage. The output voltage across the LED load will be the sum of the PFC stage 50 output and the ripple cancellation stage 308 output. As a result, the double-line-frequency component in the LED current ($i_{LED}(t)$) is significantly suppressed and the LED current is substantially ripple-free ($i_{rip}=0$).

An advantage of the current ripple sensing RCC embodiments and the double-loop current ripple sensing RCC embodiments is that there is no mismatch problem for the sensing circuit, because the sensed output ripple information is compared to a DC reference directly, rather than an AC voltage reference (i.e., sensed PFC ripple). Since the DC reference is of high accuracy (i.e., a stable, constant DC value), the ripple cancellation performance is improved.

Figure 8B:
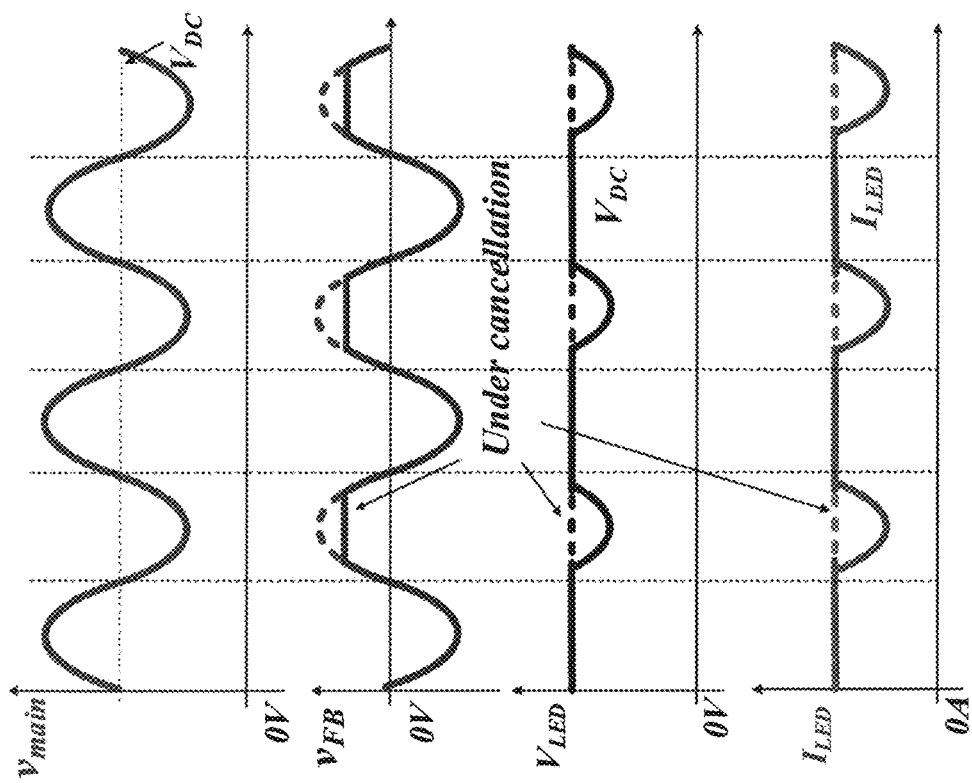
FIG. 8B shows waveforms of an under-cancellation phenomenon.

The double-loop current sensing ripple cancellation strategy avoids the 120 Hz ripple in the output caused by the under cancellation phenomenon described above (e.g., FIG. 8B). With the average output voltage being regulated, the average output of the PFC stage $V_{o\_pfc\_avg}$ (e.g., implemented with a buck converter) is fixed at $V_{LED}$-$V_{o\_buck\_avg}$, and the under cancellation phenomenon is avoided as long as the input voltage of the buck converter $V_{in\_buck}$ is higher than the buck output voltage $V_{o\_buck}$.

Embodiments will be further described by way of the following non-limiting examples.

Example 1

An experimental 100 W LED driver was built according to the parameters in Table 1.

TABLE 1

| LED Driver Parameters | |
|---|---|
| Specifications of LED driver | |
| Line input voltage ($v_{in}$) | 85~265 V |
| LED output voltage ($V_{LED}$) | 90~150 V |
| Rated LED output current ($I_{LED}$) | 0.67 A |
| Rated power ($P_O$) | 100 W |
| Line frequency (f) | 60 Hz |

TABLE 1-continued

LED Driver Parameters

Active Clamp Single-stage Flyback PFC Stage

| | |
|---|---|
| Output Capacitor ($C_{main}$) | 56 µF (250 V Film Cap) |
| Switches ($Q_{main}$ $Q_{aux}$) | SPP11N80C3 |
| Diode (D) | C3D16060 |
| Turns Ratio ($N_p$:$N_s$) | 1.2:1 |
| Magnetizing Inductance ($L_m$) | 1300 µH |
| Internal Leakage Inductor ($L_{lek}$) | 33 µH |
| External Leakage Inductor ($L_{ext}$) | 15 µH |
| Active Clamp Capacitor ($C_{clamp}$) | 470 nF (400 V Film Cap) |
| Single-stage PFC Controller | NCP1652A |

FB RCC Stage

| | |
|---|---|
| Switching Frequency ($f_{sw}$) | 156 KHz |
| Input Floating Capacitor ($C_{aux}$) | 10 µF × 12 |
| | (50 V 1206 Ceramic Cap) |
| Output Inductor ($L_{FB}$) | 22 µH |
| Output Capacitor ($C_{FB}$) | 4.7 µF × 1 |
| | (50 V 1206 Ceramic Cap) |
| Full-bridge Switches ($Q_1$~$Q_4$) | TPN11003NLLQ × 4 |
| | (30 V, 11 mΩ) |

LED String Load

| | |
|---|---|
| LED Chip Part Number | XMLEZW-02-0000-0B00T527F |
| | (15~27 pcs for different load combination) |
| Forward Voltage/pcs ($V_f$) Typ | 6 V |
| Max Current ($I_{max}$) | 2 A |
| Luminous Flux/pcs @ 670 mA | 270 lm |

Figures 9A, 9B:
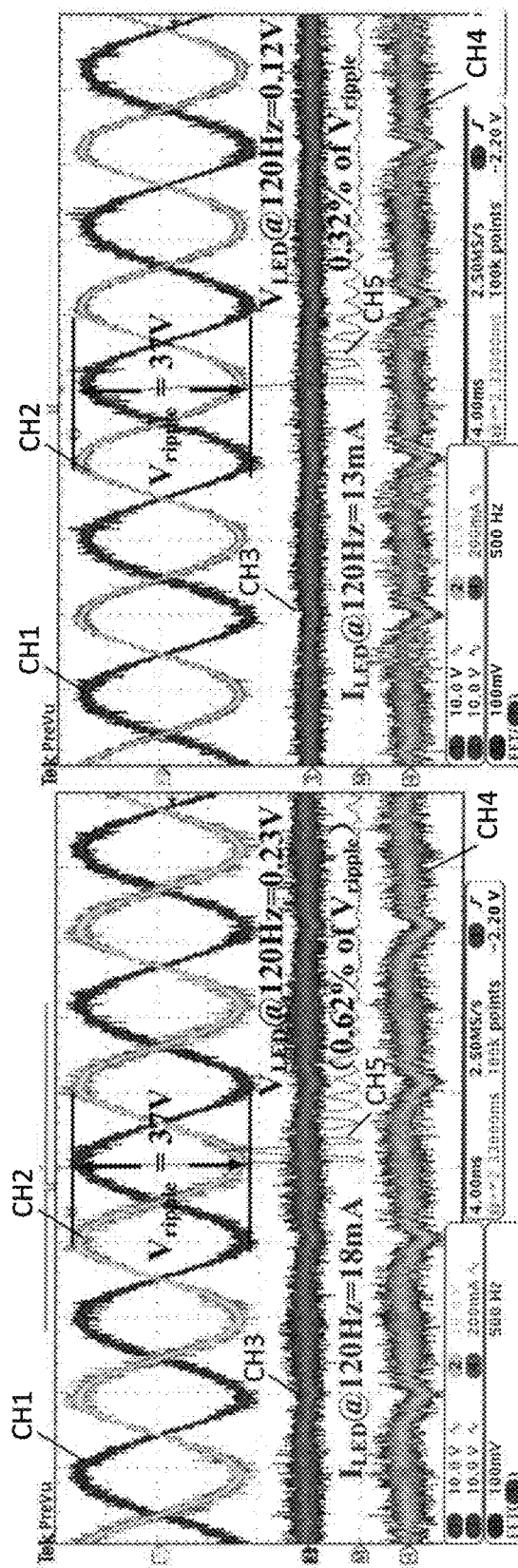
FIGS. 9A and 9B show key waveforms of a current ripple sensing flyback RCC LED driver embodiment, where $V_{in}$=110 Vac and $I_{LED}$=0.67 A.

FIGS. 9A and 9B show that the prototype produced only a very small LED driving voltage ripple @120 Hz (0.23 V RMS when $V_{LED}$=150 V; 0.12 V RMS when $V_{LED}$=90 V) with only 60.7 µF total output capacitance ($C_{main}$+$C_{FB}$). According to Equation (1), when using conventional single-stage LED drivers, such a small ripple voltage can be only achieved when the output capacitance is increased to 2760 µF. Therefore, the total required output capacitance of the single-stage driver was reduced by 97.8%.

Figures 10A, 10B:
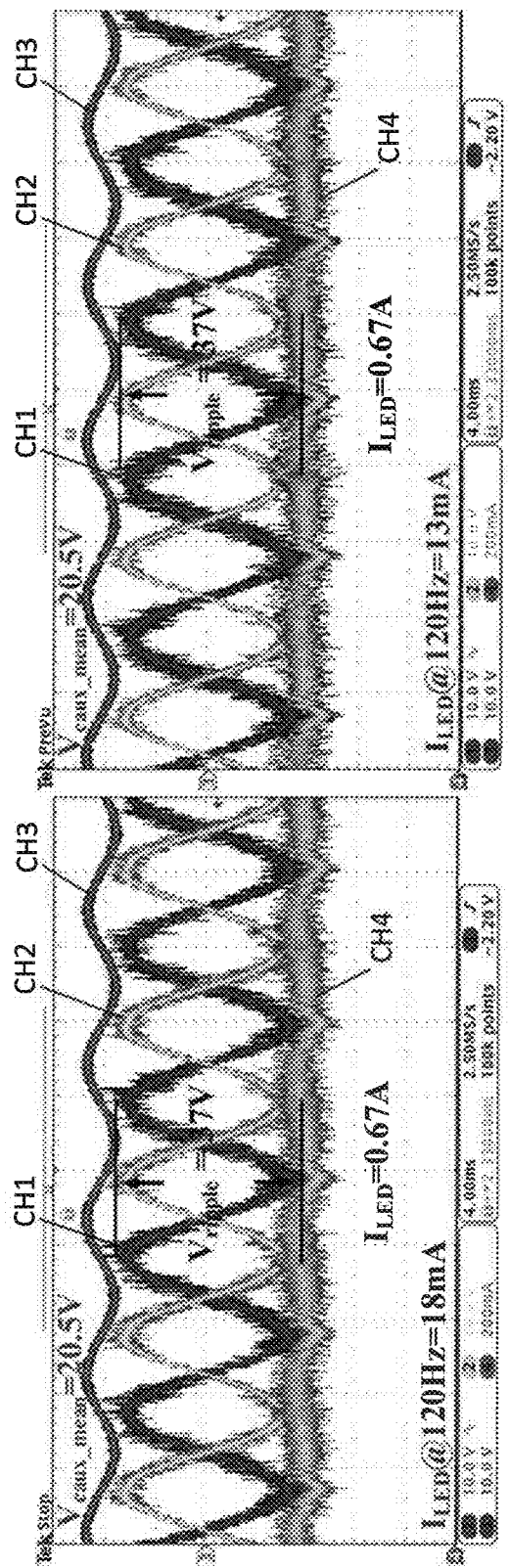
FIGS. 10A-10D show input voltage auto-tracking performance of a current ripple sensing flyback RCC embodiment, where $V_{in}$=110 Vac.
Figures 10C, 10D:
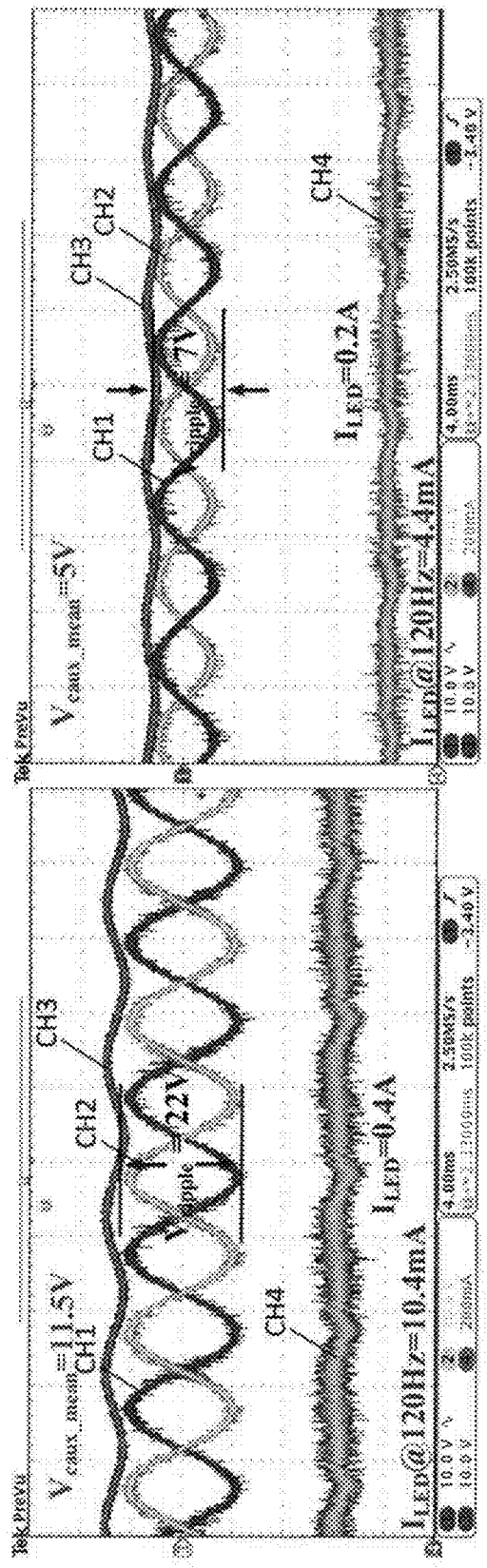

FIGS. 10A and 10B show the same 37 V ripple of the main stage (CH1) at the same LED current (CH4, 0.67 A) but at different LED voltages ($V_{LED}$=150 V in FIG. 7A and $V_{LED}$=90 V in FIG. 10B). FIGS. 10A, 10C, and 10D show the different main stage voltage ripples (CH1) corresponding to the different LED currents (CH4) at the same LED voltage ($V_{LED}$=150 V). As described above, with small bumps occurring on the LED output current, the average value of input voltage $V_{Caux}$ (CH3) is auto-tuned close to the peak values of CH1 (FBRCC output voltage, $v_{FB}$) under all the given conditions: FIG. 10A: $V_{LED}$=150 V, $I_{LED}$=0.67 A; FIG. 10B: $V_{LED}$=90 V, $I_{LED}$=0.67 A; FIG. 10C: $V_{LED}$=150 V, $I_{LED}$=0.4 A; FIG. 10D: $V_{LED}$=150 V, $I_{LED}$=0.2 A. Accordingly, the voltage stress on the RCC components is reduced and the RCC efficiency is improved.

Figures 11A, 11B:
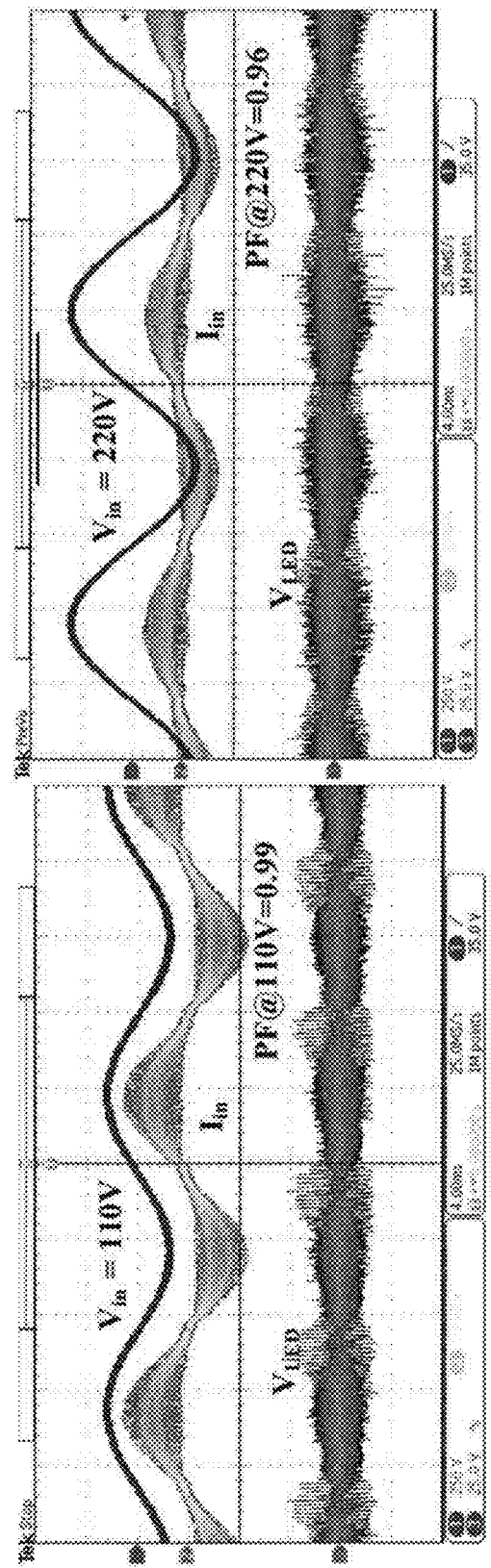
FIGS. 11A and 11B show input current and output voltage of a current ripple sensing flyback RCC embodiment, where $V_{in}$=110 Vac or 220 Vac, $V_{LED}$≈150 V, $I_{LED}$=0.67 A, $P_O$=100 W.
Figures 12A, 12B:
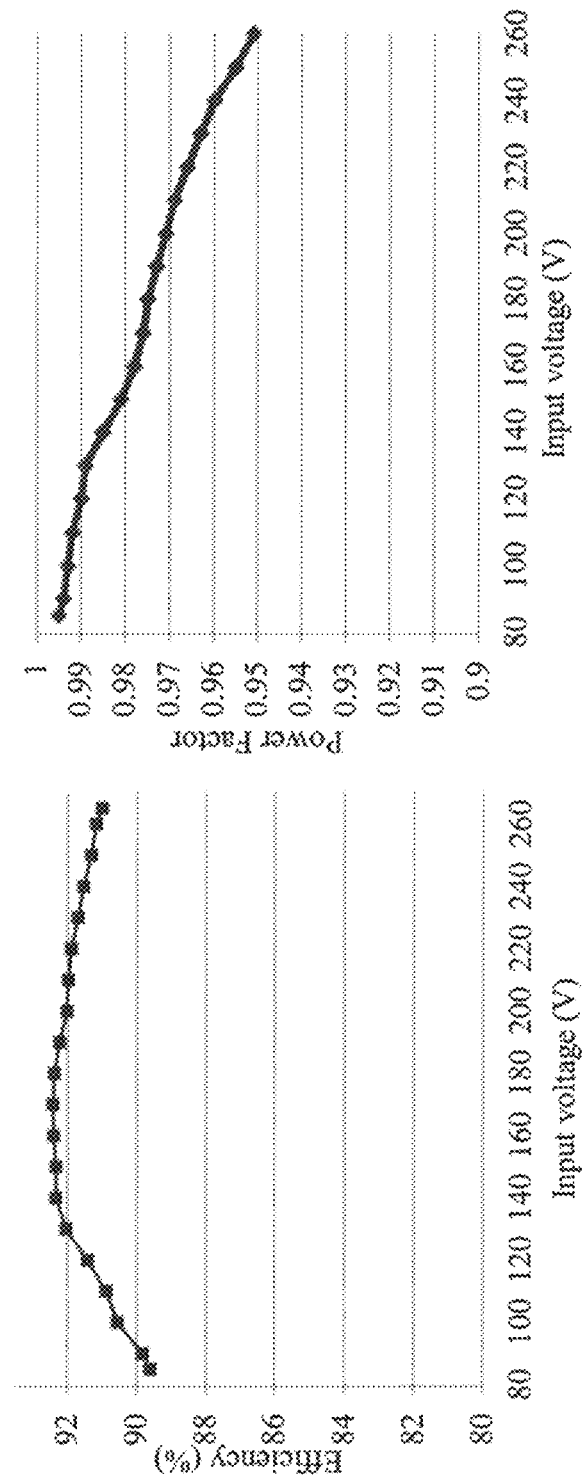
FIGS. 12A and 12B show performance of a current ripple sensing flyback RCC embodiment at full load, where $C_{main}$=56 µF, $V_{LED}$≈150 V, $I_{LED}$=0.67 A, $P_o$=100 W.
Figure 13:
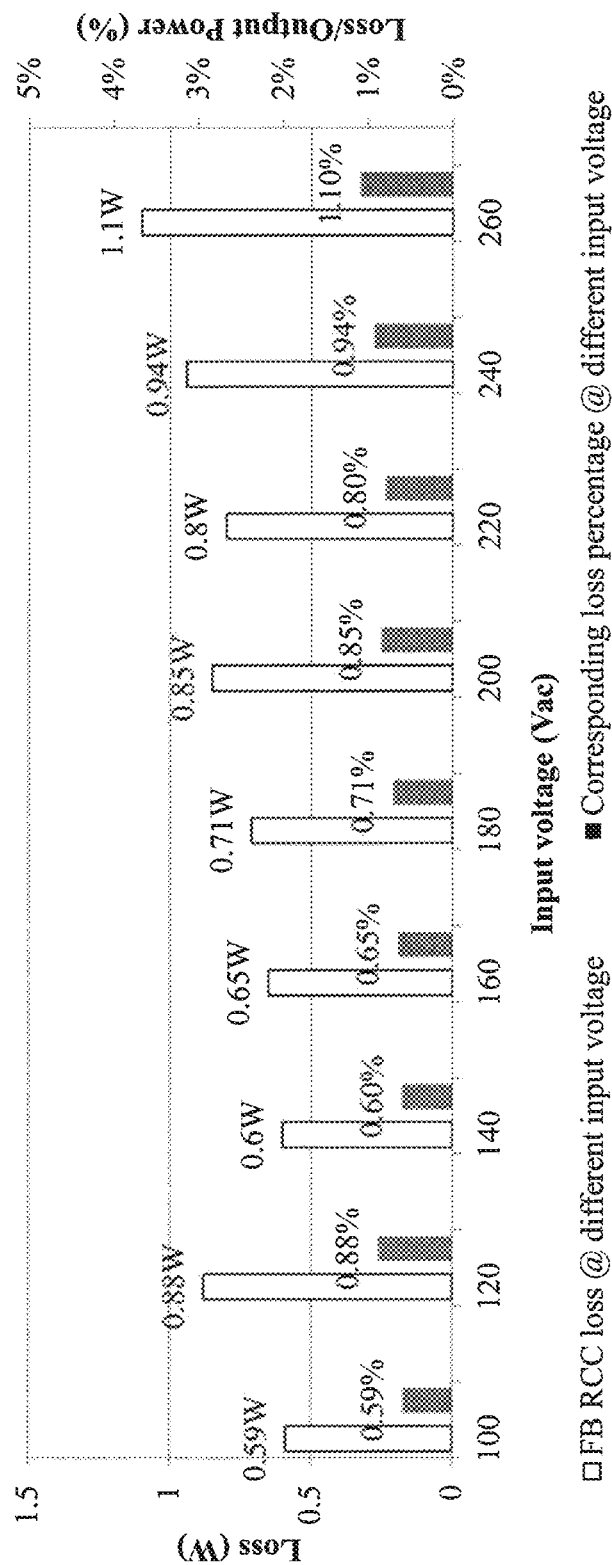
FIG. 13 shows RCC stage loss in a current ripple sensing flyback RCC embodiment, where $V_{LED}$≈150 V, $I_{LED}$=0.67 A, $P_o$=100 W.
Figures 14A, 14B:
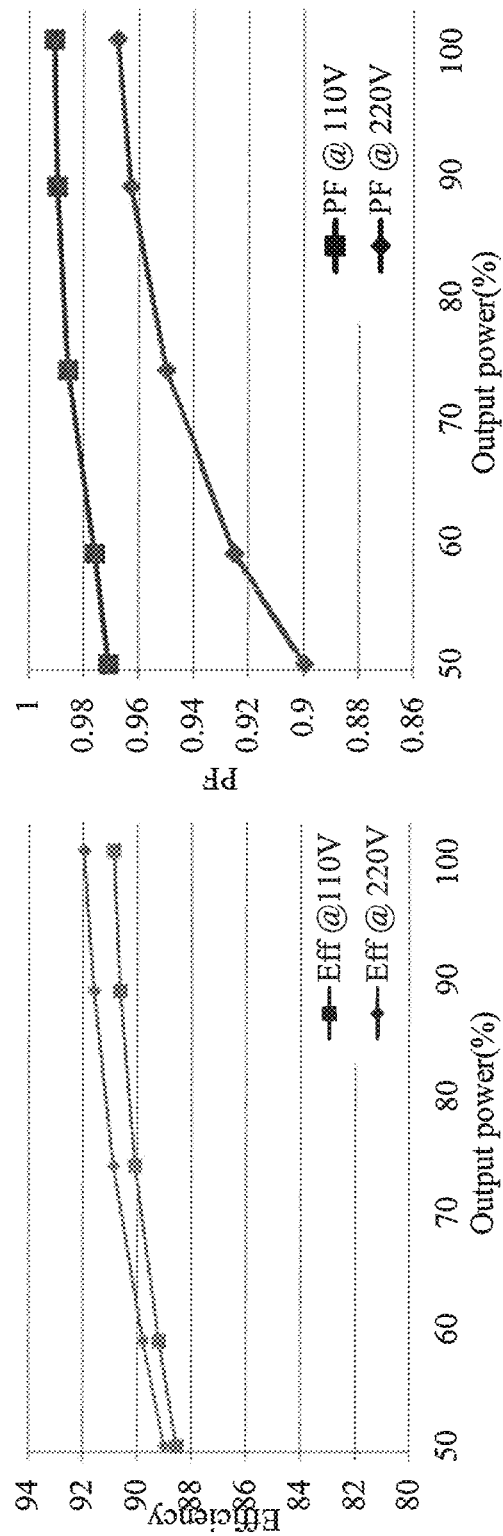
FIGS. 14A and 14B are plots showing efficiency and power factor for a current ripple sensing flyback RCC embodiment during dimming, where $C_{main}$=56 µF, $V_{LED}$≈150 V.

Under universal AC input the experimental prototype shows a system efficiency of 91% at $v_{in}$=110 Vac and 92% at $v_{in}$=220 Vac, and a peak system efficiency of 92.5% (FIG. 12A). The PF over the range of input voltage (85~265 Vac) is shown in FIG. 12B. FIGS. 11A and 11B show the input voltage and input current waveforms at $v_{in}$=110 Vac and 92% at $v_{in}$=220 Vac, respectively, and corresponding power factors of 0.99 and 0.96. The FBRCC stage loss was generally less than 1% under a range of input voltage, as shown in FIG. 13. Dimming performance of the LED driver is shown in FIGS. 14A and 14B. Under the nominal input voltages of 110 Vac and 220 Vac, the half-load ($P_O$=50 W, $V_{LED}$≈150 V) system efficiency is generally higher than 88.5% and the PF is over 0.9.

Example 2

A simulation model of a 240 W continuous current mode (CCM) single-stage flyback LED driver with buck ripple cancellation circuit was built in PSIM (version 9.1.3, Powersim Inc., Rockville, Md.). The design specifications are shown in Table 2 and the circuit parameters are given in Table 3.

TABLE 2

Specifications of LED driver for PSIM simulation

| $V_{in}$ | $V_{LED}$ | $I_{LED}$ | $P_O$ | $f_{line}$ |
|---|---|---|---|---|
| 85 Vac | 60 Vdc | 4 A | 240 W | 60 Hz |

TABLE 3

Circuit parameters for LED driver for PSIM simulation

Active Clamp Single-Stage Flyback PFC Stage

| | |
|---|---|
| Output Capacitor ($C_{main}$) | 470 µF |
| Turns Ratio ($N_p$:$N_{s1}$:$N_{s2}$) | 6:5:1 |
| Magnetizing Inductance ($L_m$) | 1300 µH |
| Leakage Inductance ($L_{lek}$) | 33 µH |
| External Leakage inductor ($L_{ext}$) | 15 µH |
| Active Clamp Capacitor ($C_{clamp}$) | 277 nF |
| | (68 nF × 4, 400 V Film Caps) |

Buck RCC with double-loop current-ripple-sensing ripple cancellation

| | |
|---|---|
| Switching Frequency ($f_{sw}$) | 200 KHz |
| Input Capacitor ($C_{aux}$) | 120 µF |
| Input voltage ($V_{aux}$) | 30 V |
| Output Inductor ($L_{FB}$) | 22 µH |
| Output Capacitor ($C_{FB}$) | 10 µF |

Figure 15A:
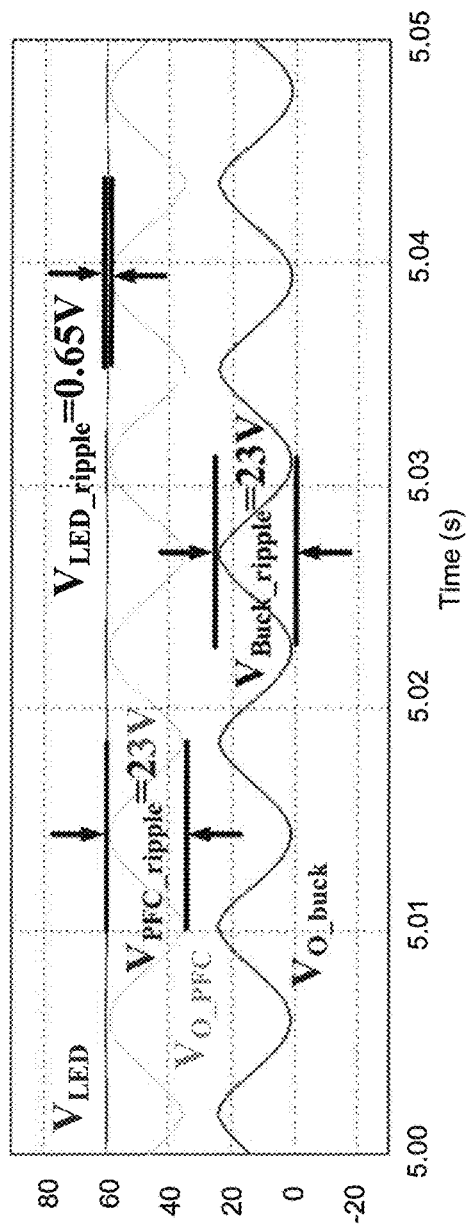
Figure 15B:
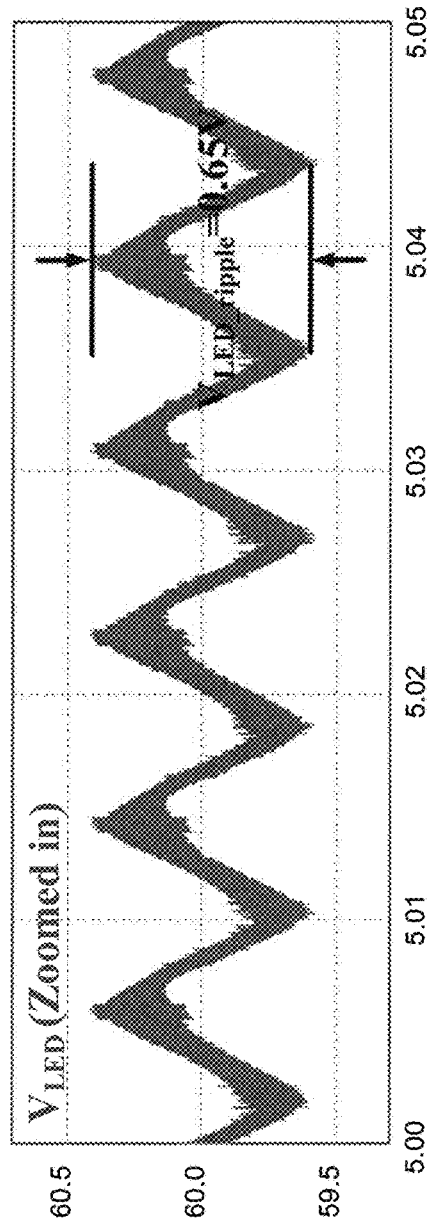

The simulation results are shown in FIGS. 15A and 15B. In FIG. 15A it can be seen that the AC voltage generated by the buck ripple cancellation stage ($V_{buck\_ripple}$) mitigates the 120 Hz PFC ripple ($V_{PFC\_ripple}$), resulting in a flat voltage ($V_{LED}$). This corresponds to a flat LED current. The 120 Hz PFC voltage ripple is 23V pk-pk before cancellation. FIG. 15B shows that the LED output voltage ripple at 120 Hz is only 0.65 V after cancellation.

Figure 16:
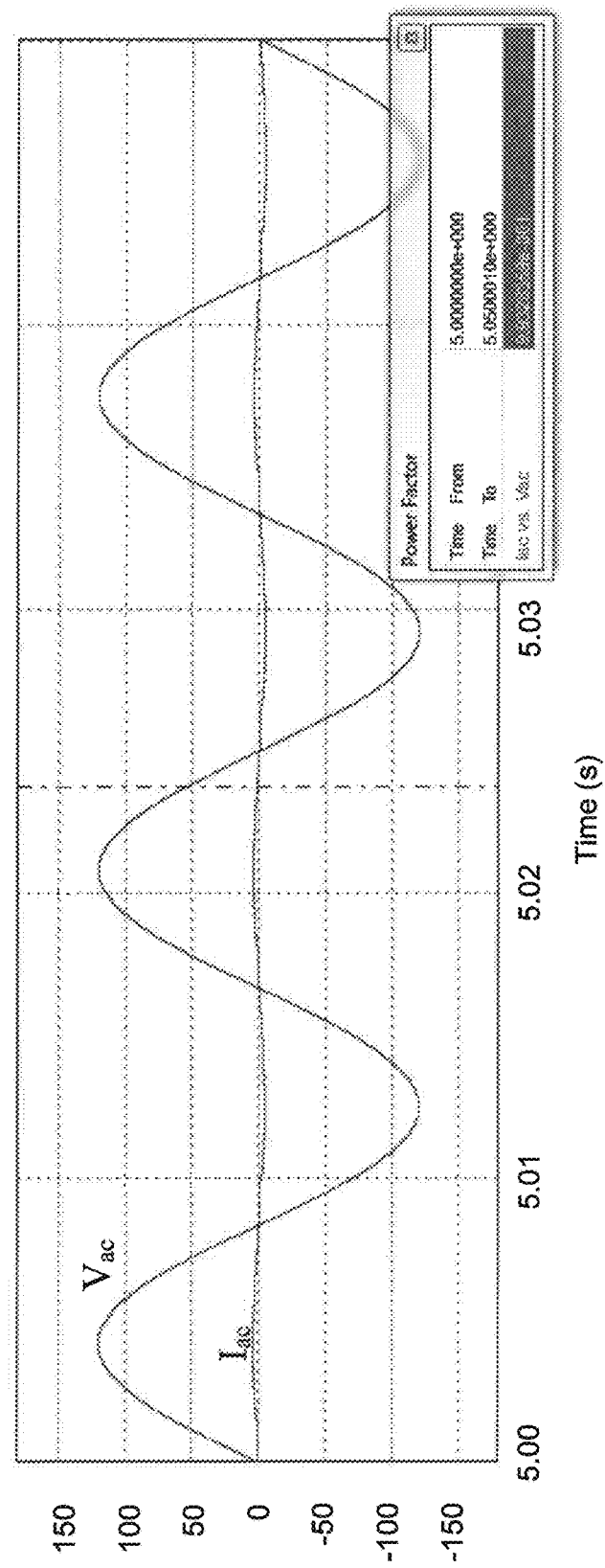
FIG. 16 shows simulation results of input current and input voltage of a double-loop current ripple sensing embodiment, with $V_{in}$=85 Vac, $V_{LED}$≈60 V, $I_{LED}$=4 A, $P_O$=240 W, PF=0.993.

FIG. 16 shows the simulation results of input current and input voltage, when $V_{in}$=85 Vac, $V_{LED}$=60 V, $I_{LED}$=4 A, PO=240 W. The power factor is 0.993.

All cited publications are incorporated herein by reference.

EQUIVALENTS

Those skilled in the art will recognize or be able to ascertain variants of the embodiments described herein. Such variants are within the scope of the invention and are covered by the appended claims.

The invention claimed is:
1. A controller for an alternating current-to-direct current (AC-DC) power converter comprising a main power factor correction (PFC) stage, the controller comprising:
a sensing circuit that senses a power converter load current;
a main PFC stage control loop that regulates an average load current; and
a current ripple control loop including an AC current ripple sensing block and a compensation network that uses the sensed power converter load current to generate a signal corresponding to a double-line-frequency ripple of the load current, and uses the signal to regulate a series ripple cancellation converter output;

wherein the series ripple cancellation converter output substantially cancels the double-line-frequency ripple in the load current.

2. The controller of claim 1, wherein the main PFC stage control loop and the current ripple control loop share the same load current sensing circuit.

3. The controller of claim 1, wherein the series ripple cancellation converter comprises a converter topology selected from full-bridge, buck, flyback, boost, buck-boost, and floating capacitor full-bridge.

4. The controller of claim 1, wherein the series ripple cancellation converter comprises a floating capacitor full-bridge converter.

5. The controller of claim 4, wherein the current ripple control loop comprises a double loop; including:
a slow voltage control loop that regulates the ripple cancellation converter output voltage average value; and
a fast current ripple cancellation loop that uses a signal corresponding to the double-line-frequency load current ripple to regulate the series ripple cancellation converter output;
wherein the double-line-frequency load current ripple is substantially cancelled.

6. The controller of claim 1, wherein the series ripple cancellation converter generates an out of phase double-line-frequency voltage ripple that cancels the double-line-frequency ripple of the load current.

7. The controller of claim 1, wherein the load comprises one or more LED.

8. An AC-DC power converter comprising the controller of claim 1 and a main PFC stage.

9. The AC-DC power converter of claim 8, wherein the AC-DC power converter is an LED driver.

10. A method for controlling an alternating current-to-direct current (AC-DC) power converter comprising a main power factor correction (PFC) stage, comprising:
sensing a power converter load current via a sensing circuit;
using a main PFC stage control loop to regulate an average load current; and
using a current ripple control loop including an AC current ripple sensing block and a compensation network to generate a signal corresponding to a double-line-frequency ripple of the load current, and using the signal to regulate a series ripple cancellation converter output;
wherein the series ripple cancellation converter output substantially cancels the double-line-frequency load current ripple.

11. The method of claim 10, comprising using one load current sensing circuit for the main PFC stage control loop and the current ripple control loop.

12. The method of claim 10, wherein sensing the double-line-frequency current ripple comprises blocking a DC component of the LED current.

13. The method of claim 10, wherein:
the signal corresponding to the double-line-frequency ripple of the load current is an error signal generated by subtracting the double-line-frequency current ripple and a non-ripple reference;
the method comprising using the error signal to regulate the series ripple cancellation converter to generate an out of phase double-line-frequency voltage ripple;
wherein the out of phase double-line-frequency voltage ripple cancels the double-line-frequency ripple in the PFC output voltage, resulting in cancellation of the double-line-frequency ripple in the load current.

14. The method of claim 10, wherein using a current ripple control loop comprises:
using a slow voltage control loop that regulates the ripple cancellation converter output voltage average value; and
using a fast current ripple cancellation loop that uses the double-line-frequency load current ripple to regulate the series ripple cancellation converter output;
wherein the double-line-frequency load current ripple is substantially cancelled.

15. The method of claim 10, wherein the load comprises one or more LED.

* * * * *